(12) United States Patent
Zhan et al.

(10) Patent No.: US 11,935,191 B2
(45) Date of Patent: Mar. 19, 2024

(54) DATA PROCESSING METHOD FOR ANALOGUE MODELLING EXPERIMENT OF HYPERGRAVITY GEOLOGICAL STRUCTURE

(71) Applicant: ZHEJIANG UNIVERSITY, Zhejiang (CN)

(72) Inventors: Liangtong Zhan, Zhejiang (CN); Chi Zhang, Zhejiang (CN); Jianxun Zhou, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 781 days.

(21) Appl. No.: 17/041,002

(22) PCT Filed: Apr. 2, 2019

(86) PCT No.: PCT/CN2019/080943
§ 371 (c)(1),
(2) Date: Sep. 24, 2020

(87) PCT Pub. No.: WO2020/098203
PCT Pub. Date: May 22, 2020

(65) Prior Publication Data
US 2021/0118224 A1    Apr. 22, 2021

(30) Foreign Application Priority Data

Nov. 13, 2018 (CN) .......................... 201811345344.0
Nov. 13, 2018 (CN) .......................... 201811345954.0

(51) Int. Cl.
*G06T 17/10* (2006.01)
*G01V 7/04* (2006.01)
(Continued)

(52) U.S. Cl.
CPC ................ *G06T 17/10* (2013.01); *G01V 7/04* (2013.01); *G06T 17/05* (2013.01); *G09B 23/10* (2013.01); *G09B 23/40* (2013.01)

(58) Field of Classification Search
CPC .............. G06T 1/10; G06T 17/05; G01V 7/04
(Continued)

(56) References Cited

U.S. PATENT DOCUMENTS

2012/0044476 A1 *   2/2012   Earhart ................... G01S 17/58
356/4.01

OTHER PUBLICATIONS

Faisal_2015 (Physical analog (centrifuge) model investigation of contrasting structural styles in the Salt Range and Potwar Plateau, northern Pakistan, Journal of Structural Geology 77 (2015) 277-292). (Year: 2015).*

(Continued)

*Primary Examiner* — Brian S Cook

(57) ABSTRACT

A data processing method for an analogue modelling experiment of a hypergravity geological structure includes steps of: performing two-dimensional photographing and three-dimensional elevation scanning with an analogue modelling experiment device with a curved model surface for the hypergravity geological structure, so as to collect initial elevation data and initial velocity field data; and correcting the initial elevation data and the initial velocity field data to obtain corrected elevation data and corrected velocity field data. The data processing method can realize orthographic correction and three-dimensional projection transformation of initial elevation data, as well as orthographic correction and two-dimensional projection transformation of initial velocity field data, which can more realistically and objectively reflect the experimental phenomenon, which is conducive to truly expressing the experimental results and facilitates the analogy analysis with the actual geological prototype.

7 Claims, 4 Drawing Sheets

(51) Int. Cl.
  *G06T 17/05* (2011.01)
  *G09B 23/10* (2006.01)
  *G09B 23/40* (2006.01)
(58) Field of Classification Search
  USPC .............................................................. 703/6
  See application file for complete search history.

(56) References Cited

OTHER PUBLICATIONS

Take_2015 (Thirty-Sixth Canadian Geotechnical Colloquium: Advances in Visualization of geotechnical processes through digital image correction, 2015) (Year: 2015).*

Schofield_1980 (Cambridge Geotechnical Centrifuge Operations, Geotchnique 30, No. 3, 227-268). (Year: 1980).*

Giacomo Corti, Tim P. Dooley, Lithospheric-scale centrifuge models of pull-apart basins, Tectonophysics, vol. 664, 2015, pp. 154-163, ISSN 0040-1951.

John M Dixon, John M Summers, Recent developments in centrifuge modelling of tectonic processes: equipment, model construction techniques and rheology of model materials, Journal of Structural Geology, vol. 7, Issue 1, 1985, pp. 83-102, ISSN 0191-8141.

Ramberg, H., Model Experimentation of the Effect of Gravity on Tectonic Processes, Geophysical Journal of the Royal Astronomical Society, vol. 14, No. 1-4, pp. 307-329.

Todd E. Noble, John M. Dixon, Structural evolution of fold-thrust structures in analog models deformed in a large geotechnical centrifuge, Journal of Structural Geology, vol. 33, Issue 2, 2011, pp. 62-77, ISSN 0191-8141.

Peltzer, Gilles. Centrifuged experiments of continental scale tectonics in Asia. Bulletin of the Geological Institution of the University of Upsala. 1998. p. 115-128. ISSN 0302-2749.

* cited by examiner

DATA PROCESSING METHOD FOR ANALOGUE MODELLING EXPERIMENT OF HYPERGRAVITY GEOLOGICAL STRUCTURE

BACKGROUND OF THE PRESENT INVENTION

Field of Invention

The present invention relates to a data processing method, and more particularly to a data processing method for an analogue modelling experiment of a hypergravity geological structure.

Description of Related Arts

Since the deformation process of geological structure uses millions of years as the basic timing unit, human beings cannot directly observe its complete evolutionary history. However, structure simulation can reproduce the deformation process of the geological structure under laboratory conditions with an acceptable duration, which is an effective way to understand the process and mechanism of structural deformation. Nowadays, research methods of structure analogue modelling have been studied for more than 200 years. Since there is no substantial breakthrough for mathematical simulation method, analogue modelling research is still the most important method to study the process and mechanism of structural deformation.

Due to cost constraints, the conventional structure analogue modelling is mainly carried out under normal gravity conditions. However, according to the similar theory of structure simulation, when a model with scaled time and scaled size is used to simulate the geological structure process in the laboratory, in addition to adjusting the simulation material parameters of natural rock, gravity acceleration value should also be increased proportionally. Normal gravity structure simulation device has congenital similarity defects, leading to great limitations on structure process simulation involving rock flow (such as upwelling of the mantle plume, asthenosphere convection, lower crustal flow, and diapir of magma and gypsum formations).

It is well-known that the simulation experiments carried out under hypergravity conditions created by a centrifuge are an effective way to solve the above problem, and analogue modelling experimental device of hypergravity geological structure, which is designed and developed based on the specific characteristics of the large engineering centrifuge, has technical advantages such as high model resolution, large experimental operation space and convenient experimental data collection. However, due to an arc-shaped cylindrical surface of its modeling console, analogue models are kept as an arc-shaped cylindrical surface throughout the experiment. Furthermore, data of the analogue modelling experiment of the hypergravity geological structure need to be collected by image shooting and elevation scanning on the top surface of the models, wherein the image data need to be processed by PIV (Particle Image Velocimetry) to convert them into velocity field data. Therefore, the elevation data and velocity field data directly obtained from the experiment will inevitably contain systematic errors caused by the arc-shaped cylindrical surface on the top surface of the models, which seriously affect the comparison with the results of analogue modelling experiment of normal gravity geological structure, and are also quite different from the actual geological prototype. As a result, comparative analysis of the experimental results is impossible.

SUMMARY OF THE PRESENT INVENTION

In order to eliminate systematic influence of non-horizontal model surface on experimental data, the present invention provides a data processing method for an analogue modelling experiment of a hypergravity geological structure, wherein the data processing method uses orthorectification and projection transformation to eliminate the systematic errors of original data according to mathematical principles, so as to achieve quantitative correction to data of the analogue modelling experiment of the hypergravity geological structure.

The present invention provides the following technical scheme.

The data of the analogue modelling experiment of the hypergravity geological structure are divided into three categories, namely image data, elevation data and velocity field data. The present invention mainly relates to a processing method for the elevation data and the velocity field data, comprising steps of:

1) performing two-dimensional photographing and three-dimensional elevation scanning with an analogue modelling experiment device with a curved model surface for the hypergravity geological structure, so as to collect initial elevation data and initial velocity field data; and 2) correcting the initial elevation data and the initial velocity field data to obtain corrected elevation data and corrected velocity field data.

The step 1) specifically adopts the analogue modelling experiment device of the hypergravity geological structure, wherein a deformation material is placed on a curved table of a centrifuge basket; a top surface of the curved table is an arc-shaped cylindrical surface, and the curved table is used as an experimental operation table; a model frame is placed on the curved table, and the deformation material is placed in an enclosed area of the model frame; an industrial camera or a three-dimensional scanner is provided right above the curved table; during rotation of a centrifuge, the arc-shaped cylindrical surface of the curved table on the centrifuge basket rotates around a rotation axis of the centrifuge; when the centrifuge rotates, trajectories of all parts of the arc-shaped cylindrical surface of the curved table are on a same cylindrical surface with the rotation axis of the centrifuge as a central axis; the initial elevation data and the initial velocity field data are obtained by performing two-dimensional photographing and three-dimensional elevation scanning on a top surface of the deformation material by the industrial camera or the three-dimensional scanner.

The foregoing structure can effectively avoid non-experimental flow of fluid experimental deformation materials. The arc-shaped cylindrical surface can ensure that the experimental materials under rotating centrifugation are on a same gravitational equipotential surface, making the analogue modelling of geological structures more accurate.

The deformation material is usually experimental materials with different deformation characteristics, such as quartz sand, micro glass beads, silica gel and the like.

The analogue modelling experiment device comprises: a bottom plate and the curved table; wherein the bottom plate is placed on the centrifuge basket, and screw assemblies are provided on both sides of the bottom plate; each of the screw assemblies comprises: a screw rod, a slide rail, a diverter and a screw rod supporter, wherein the screw rod is parallel to the bottom plate; two ends of the screw rod are supported and connected between the diverter and the screw rod supporter; the diverter and the screw rod supporter are fixed on the bottom plate, and the slide rail is fixed on the bottom plate under the screw rod; a motor is fixed on the bottom plate and between same ends of the two screws; two output shafts are symmetrically arranged at both ends of the motor, which are connected to one end of the two diverters of the screw assemblies through corresponding transmission shafts, respectively; the other ends of the diverters are connected to ends of the screw rods, respectively; a fixed baffle is connected between the two screw rods of the two screw assemblies; two end portions of the fixed baffle are screwed with the screw rods, and a bottom of each end of the fixed baffle is engaged with the slide rail; a slider is connected to the bottom of each end of the fixed baffle and is engaged with the slide rail; a detachable baffle is mounted on a bottom portion of the fixed baffle, and a bottom end of the detachable baffle is hinged with a swinging baffle through a hinge; the curved table is fixed at a center of the bottom plate, and the top surface of the curved table is the arc-shaped cylindrical surface; a tangent direction of the arc-shaped cylindrical surface is parallel to the screw rod, and a generatrix direction of the of the arc-shaped cylindrical surface is parallel to the fixed baffle; when the centrifuge rotates, the trajectories of all the parts of the arc-shaped cylindrical surface of the curved table are on the same cylindrical surface with the rotation axis of the centrifuge as the central axis; the swinging baffle is made of a flexible material, which covers and contacts with the arc-shaped cylindrical surface of the curved table.

When the centrifuge rotates, the center axis of the arc-shaped cylindrical surface coincides with the rotation axis of the centrifuge.

A radius of curvature of the arc-shaped cylindrical surface is equal to a distance between the rotation axis of the centrifuge during rotation and a bottom surface of the bottom plate, minus a thickness of the bottom plate, and then minus a center thickness of the curved table.

To ensure strength, the bottom plate is made of steel.

Referring to FIG. 4, the curved table is the experimental operation table on which experimental materials and models are placed. To ensure strength while considering weight, the curved table is made of aluminum alloy.

Although the arc-shaped cylindrical surface of the curved table can make the analogue modelling of geological structure more accurate, the model established as a whole is in the shape of the arc-shaped cylindrical surface as the top surface of the curved table is the arc-shaped cylindrical surface. Although a top surface of the model is fluctuated due to deformation, an overall shape is still affected by the arc-shaped cylindrical surface. As a result, the experimental data directly obtained from the top surface of the model contain systematic errors caused by a non-planar shape of the model.

In the step 2), a three-dimensional coordinate system is established for the initial elevation data collected in the analogue modelling experiment of the hypergravity geological structure; each elevation point in the initial elevation data has an initial two-dimensional plane coordinate and an initial three-dimensional elevation, and the elevation points are location points in the initial elevation data; wherein a correction method for each elevation point is as follows.

Elevation data processing refers to processing two-dimensional plane coordinates and three-dimensional elevations of all elevation points, comprising four steps of:

I, according to the initial two-dimensional plane coordinate and the initial three-dimensional elevation of the elevation point, calculating a plane coordinate offset difference of the elevation point caused by the curved model surface;

II, according to the initial two-dimensional plane coordinate of the elevation point and the plane coordinate offset difference calculated in the step I, calculating a two-dimensional plane coordinate of an orthographic point corresponding to the elevation point, thereby achieving orthographic correction of the two-dimensional plane coordinate of the elevation point;

III, according to the two-dimensional plane coordinate of the orthographic point calculated in the step II and known surface arc equation as well as arc length formula of the top surface of the curved table, calculating a corrected two-dimensional plane coordinate of the elevation point and an elevation projection difference, thereby achieving projection transformation of the two-dimensional plane coordinate of the elevation point; and IV, according to the initial three-dimensional elevation of the elevation point and the elevation projection difference calculated in the step III, calculating a corrected three-dimensional elevation of the elevation point, thereby achieving projection transformation of the three-dimensional elevation of the elevation point;

wherein the corrected elevation data of the elevation point are finally obtained by combining the corrected two-dimensional plane coordinate and the corrected three-dimensional elevation of the elevation point.

The corrected two-dimensional plane coordinate and the corrected three-dimensional elevation are calculated as:

$$\begin{cases} x_f = R \arcsin \dfrac{Q(x,z)}{R} \\ y_f = y \\ z_f = z - R + \sqrt{R^2 - [Q(x,z)]^2} \end{cases}$$

$$Q(x,z) = \dfrac{x^3 + x(R-z)\sqrt{R^2 - x^2}}{x^2 + (R-z)^2}$$

wherein x and y represent the initial two-dimensional plane coordinate of the elevation point; z represents the initial three-dimensional elevation of the elevation point; $x_f$ and $y_f$ represent the corrected two-dimensional plane coordinate of the elevation point; $z_f$ represents the corrected three-dimensional elevation of the elevation point; $Q(x, z)$ represents an X coordinate of the orthographic point corresponding to the elevation point represented by x and z; and R represents the radius of curvature of the arc-shaped cylindrical surface of the curved table.

In the step 2), a two-dimensional coordinate system is established for the initial velocity field data collected in the analogue modelling experiment of the hypergravity geological structure; each feature point is given a two-dimensional plane coordinate; according to PIV calculation principle, a velocity field is obtained by dividing a relative displacement of a corresponding feature point in two photos with a certain time interval by the time interval; each feature point in the initial velocity field data has a start point two-dimensional plane coordinate where a time step begins and a displacement from a start point to an end point within the time step, and the feature points are location points in the initial velocity field data; wherein a correction method for each feature point is as follows.

Velocity field data processing refers to processing start point two-dimensional plane coordinates and displacements of all feature points, comprising five steps of:

I, according to the start point two-dimensional plane coordinate and the displacement of the feature point, calculating an end point two-dimensional plane coordinate of the feature point;

II, according to the start point two-dimensional plane coordinate and the end point two-dimensional plane coordinate of the feature point and three-dimensional elevations of the start point and the end point, respectively calculating a start point plane coordinate offset difference and an end point plane coordinate offset difference caused by the curved model surface;

III, according to the start point two-dimensional plane coordinate and the end point two-dimensional plane coordinate, and the start point plane coordinate offset difference and the end point plane coordinate offset difference calculated in the step II, respectively calculating two-dimensional plane coordinates of orthographic points corresponding to the start point and the end point, thereby achieving orthographic correction of the start point two-dimensional plane coordinate and the end point two-dimensional plane coordinate;

IV, according to the two-dimensional plane coordinates of the orthographic points of the start point and the end point calculated in the step III and known surface arc equation as well as arc length formula of the top surface of the curved table, respectively calculating a corrected start point two-dimensional plane coordinate and a corrected end point two-dimensional plane coordinate, thereby achieving projection transformation of the start point two-dimensional plane coordinate and the end point two-dimensional plane coordinate; and V, according to the corrected start point two-dimensional plane coordinate and the corrected end point two-dimensional plane coordinate, calculating a corrected displacement of the feature point;

wherein the corrected velocity field data of the feature point are finally obtained by combining the corrected start point two-dimensional plane coordinate and the corrected displacement of the feature point.

In the step 2), the three-dimensional elevations of the start point and the end point are initial three-dimensional elevations of the start point and the end point in the initial elevation data.

A corrected two-dimensional coordinate of the feature point and the corrected displacement of the feature point along two directions of the two-dimensional coordinate system are calculated as:

$$\begin{cases} x_f = R\arcsin\dfrac{Q(x, z)}{R} \\ y_f = y \\ d_{xf} = R\left[\arcsin\dfrac{Q(x+d_x, z')}{R} - \arcsin\dfrac{Q(x, z)}{R}\right] \\ d_{yf} = d_y \end{cases}$$

$$Q(x, z) = \dfrac{x^3 + x(R-z)\sqrt{R^2 - x^2}}{x^2 + (R-z)^2}$$

$$Q(x+d_x, z') = \dfrac{(x+d_x)^3 + (x+d_x)(R-z')\sqrt{R^2 - (x+d_x)^2}}{(x+d_x)^2 + (R-z')^2}$$

wherein x and y represent an initial two-dimensional plane coordinate of the feature point; z represents an initial three-dimensional elevation of the feature point; $x_f$ and $y_f$ represent the corrected two-dimensional plane coordinate of the feature point; $d_{xf}$ and $d_{yf}$ represent the corrected displacement of the feature point along the two directions of the two-dimensional coordinate system; Q(x, z) represents an X coordinate of an orthographic point corresponding to the feature point represented by x and z; Q(x+$d_x$,z') represents an X coordinate of an orthographic point corresponding to the feature point represented by x+$d_x$ and z'; and R represents the radius of curvature of the arc-shaped cylindrical surface of the curved table.

The beneficial effects of the present invention are as follows.

The present invention adopts a special curved table structure device to make the analogue modelling of geological structure more accurate, and to ensure that the experimental model located on the device is on the same gravitational equipotential surface, thereby effectively avoiding non-experimental flow of fluid experimental deformation materials.

The method of the present invention obtains the elevation data of the analogue modelling experimental device of the hypergravity geological structure, which can effectively eliminate the plane coordinate offset difference caused by model surface fluctuation, and realizes the orthographic correction of the initial elevation data. Obtaining the elevation data of the analogue modelling experimental device of the hypergravity geological structure can effectively eliminate the plane coordinate projection difference and elevation difference caused by the non-horizontal shape of the model, and realizes the three-dimensional projection transformation of the initial elevation data. Obtaining the velocity field data of the analogue modelling experimental device of the hypergravity geological structure can effectively eliminate the plane coordinate offset difference caused by the model surface fluctuation, and realizes the orthographic correction of the initial velocity field data. Obtaining the velocity field data of the analogue modelling experimental device of the hypergravity geological structure can effectively eliminate the plane coordinate projection difference caused by the non-horizontal shape of the model, and realizes the two-dimensional projection transformation of the initial velocity field data.

The hypergravity analogue modelling experimental data processed by the processing method of the present invention can be directly used in analogy analysis with the analogue modelling experimental data of a normal gravity geological structure. The hypergravity analogue modelling experimental data processed by the processing method can more realistically and objectively reflect the experimental phenomenon, which is conducive to truly expressing the experimental results and facilitates the analogy analysis with the actual geological prototype.

Figure 1:
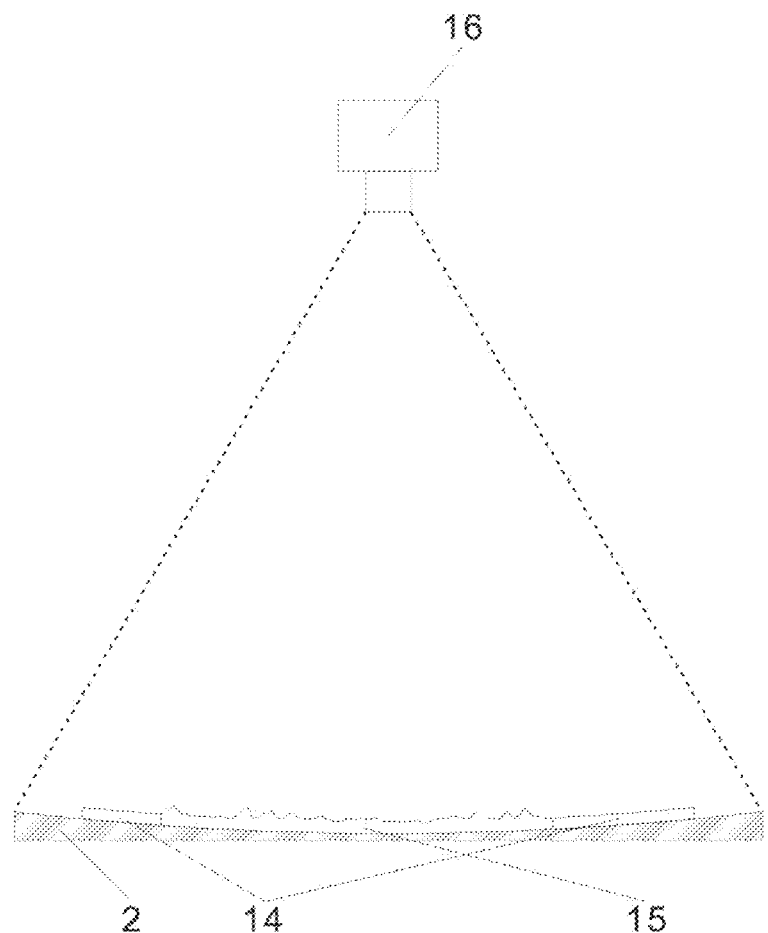
FIG. 1 is a sketch view of an analogue modelling experimental data collection device for a hypergravity geological structure.

Element reference: 1—bottom plate, 2—curved table, 3—motor, 4—transmission shaft, 5—diverter, 6—screw rod, 7—screw rod supporter, 8—slide rail, 9—fixed baffle, 10—slider, 11—detachable baffle, 12—hinge, 13—swinging baffle, 14—model frame, 15—deformation material, 16—industrial camera or three-dimensional scanner.

DETAILED DESCRIPTION OF THE PREFERRED EMBODIMENT

Referring to the drawings and embodiments, the present invention will be further illustrated.

Referring to FIG. 1, an analogue modelling experiment device of a hypergravity geological structure based on a large centrifuge uses a curved table 2 as an experimental operation table where a model frame 14 and a deformation material 15 are placed. An industrial camera or a three-dimensional scanner 16 is provided right above the table. Experimental data are obtained by performing two-dimensional photographing (or three-dimensional elevation scanning) on a top surface of the model frame 14 and the deformation material 15 within a vision field by the industrial camera (or the three-dimensional scanner) 16.

Figure 4:
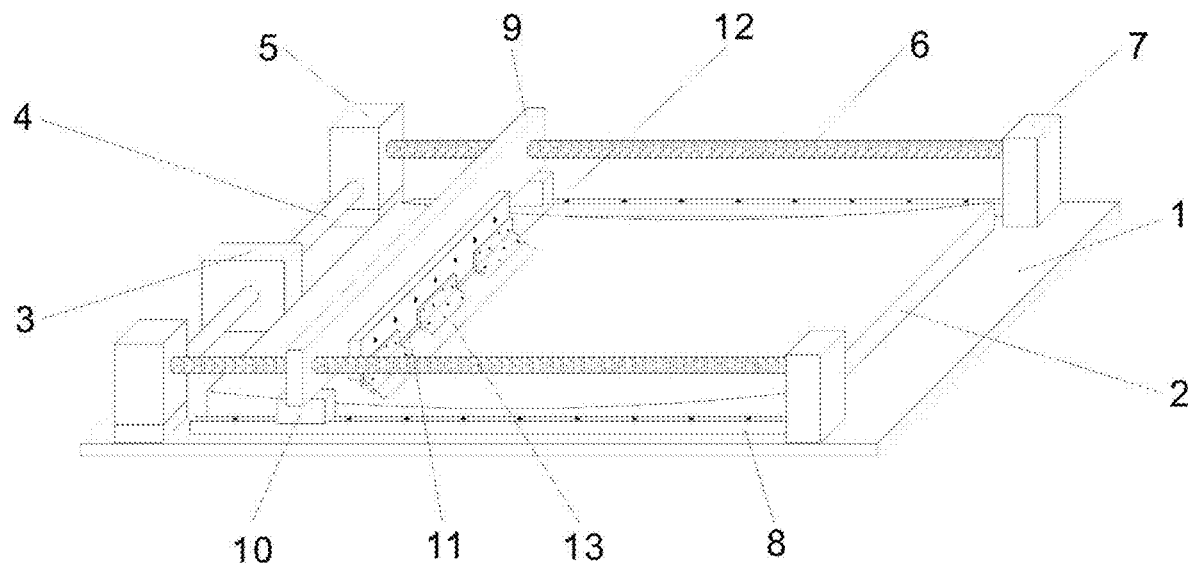
FIG. 4 is a perspective view of the device according to an embodiment of the present invention.

Referring to FIG. 4, the experiment device according to an embodiment comprises: a bottom plate 1, the curved table 2, a power portion, and a baffle portion.

Referring to FIG. 4, the bottom plate 1 is placed on a centrifuge basket, and screw assemblies are provided on both sides of the bottom plate 1; each of the screw assemblies comprises: a screw rod 6, a slide rail 8, a diverter 5 and a screw rod supporter 7, wherein the screw rod 6 is parallel to the bottom plate 1; two ends of the screw rod 6 are supported and connected between the diverter 5 and the screw rod supporter 7; the diverter 5 and the screw rod supporter 7 are fixed on the bottom plate 1, and the slide rail 8 is fixed on the bottom plate 1 under the screw rod 6; a motor 3 is fixed on the bottom plate 1 and between same ends of the two screws 6; two output shafts are symmetrically arranged at both ends of the motor 3, which are connected to one ends of the two diverters 5 of the screw assemblies through corresponding transmission shafts 4, respectively; the other ends of the diverters 5 are connected to ends of the screw rods 6, respectively; the two ends of the diverters 5 are located on two vertical sides, respectively; the transmission shaft on the diverter 5 is perpendicular to the screw rod 6; the other ends of the screw rods 6 are connected to the screw rod supporters 7 which fix and support the screw rods 6; the power portion is mainly formed by the motor 3, the transmission shafts 4 and the screw assemblies, wherein the motor 3 in the power portion works as a power source.

Figure 5:
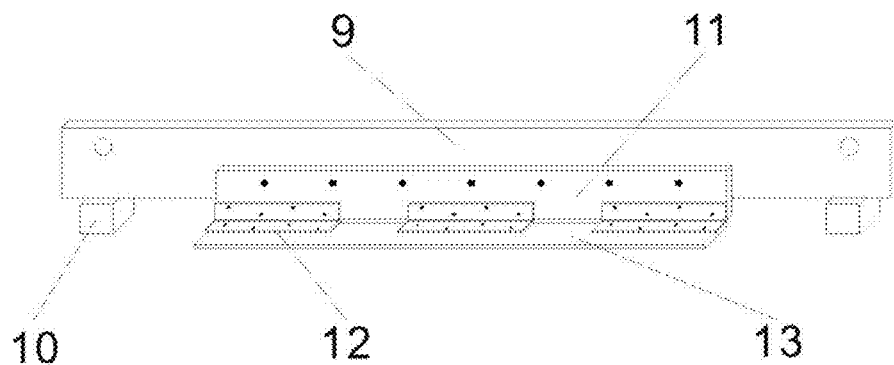
FIG. 5 is a perspective view of a baffle.
Figure 7:
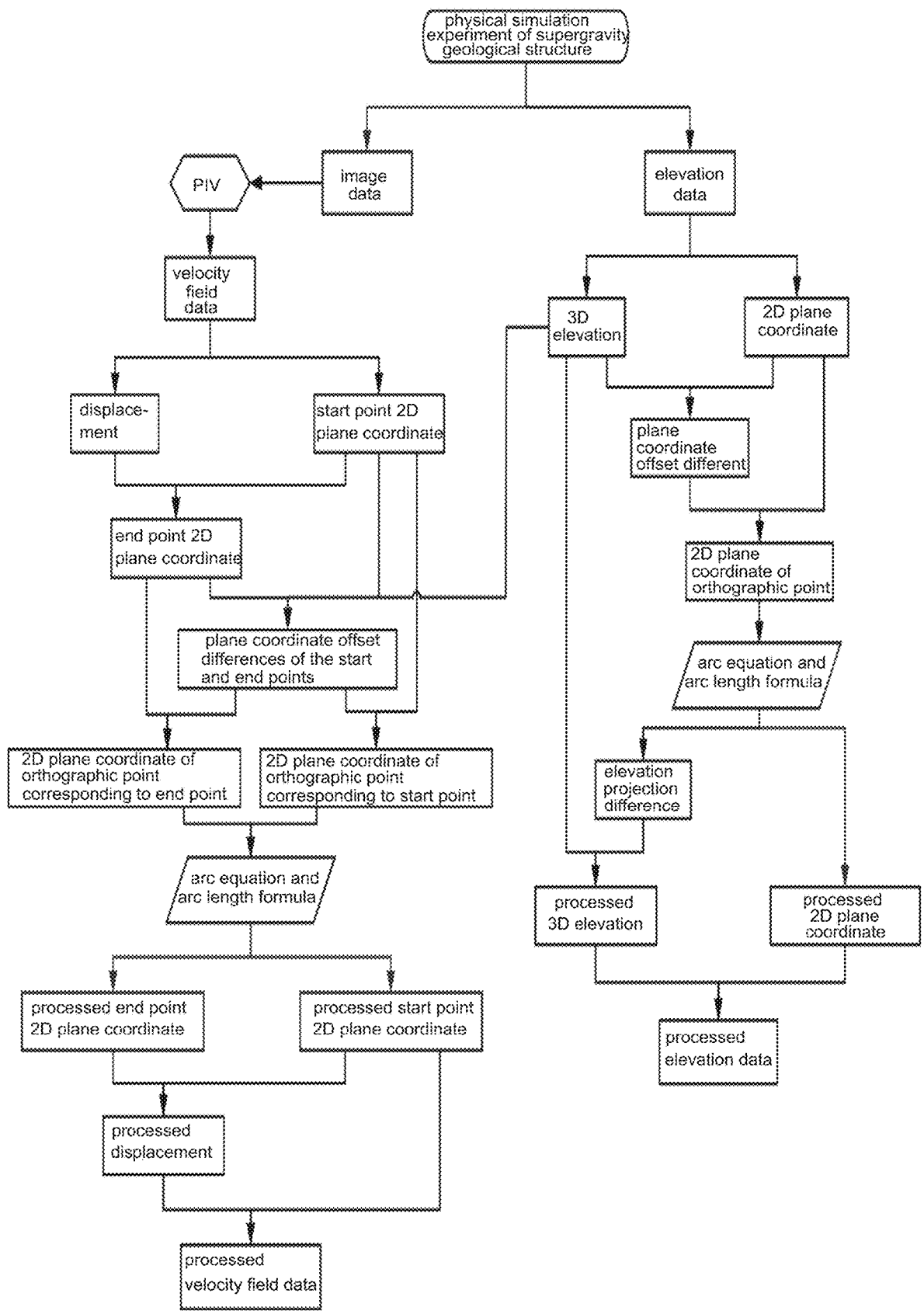
FIG. 7 is a flow chart of the velocity field data and elevation data processing.

Referring to FIG. 5, a fixed baffle 9 is connected between the two screw rods 6 of the two screw assemblies, and is parallel to the output shaft of the motor 3 and the transmission shaft 4; two end portions of the fixed baffle 9 are screwed with the screw rods 6, and a bottom of each end of the fixed baffle 9 is engaged with the slide rail 8; a detachable baffle 11 is mounted on a bottom portion of the fixed baffle 9, and a bottom end of the detachable baffle 11 is hinged with a swinging baffle 13 through a hinge 12; the baffle portion is mainly formed by the fixed baffle 9, the detachable baffle 11, the hinge 12, and the swinging baffle 13.

the curved table 2 is fixed at a center of the bottom plate 1, and the top surface of the curved table 2 is the arc-shaped cylindrical surface; a tangent direction of the arc-shaped cylindrical surface is parallel to the screw rod 6, and a generatrix direction (axial direction) of the of the arc-shaped cylindrical surface is parallel to the fixed baffle 9; a hinge shaft of the centrifuge basket and the bottom plate 1 is parallel to the bottom plate 1 but perpendicular to an axial direction of the arc-shaped cylindrical surface, so when the centrifuge rotates, the trajectories of all the parts of the arc-shaped cylindrical surface of the curved table 2 are on the same cylindrical surface with the rotation axis of the centrifuge as the central axis; when the centrifuge rotates, the center axis of the arc-shaped cylindrical surface coincides with the rotation axis of the centrifuge. Referring to FIG. 7, the swinging baffle 13 is made of a flexible material, which covers and contacts with the arc-shaped cylindrical surface of the curved table 2.

A radius of curvature of the arc-shaped cylindrical surface is equal to a distance between the rotation axis of the centrifuge during rotation and a bottom surface of the bottom plate 1 (i.e. an effective radius of the large centrifuge), minus a thickness of the bottom plate 1, and then minus a center thickness of the curved table 2. As a result, when the large centrifuge is running, the top surface of the curved table 2 completely fits a centrifugal force equipotential surface at the same position, as shown in FIG. 7, so as to avoid non-experimental flow of experiment materials, especially materials, on the curved table due to different centrifugal force equipotential surfaces.

Referring to FIG. 4, the diverter 5 turns and transmits a rotation direction of the transmission shaft 4 to the screw rod 6. Since the fixed baffle 9 is coupled with the of screw rods 6 by screw nuts, the screw rod 6 rotates and moves the fixed baffle 9 along the screw rod 6 through a pair of screw nut slide rails.

Referring to FIGS. 4 and 5, the screw nuts are embedded in both ends of the fixed baffle 9, so the two ends of the fixed baffle 9 are coupled with the two screw rods 6, respectively. The slider 10 is connected to the bottom of each end of the fixed baffle 9 and is engaged with the slide rail 8. Therefore, the slider 10 not only supports the fixed baffle 9, but also links it with the slide rail 8, so as to ensure that the fixed baffle 9 can be moved along the screw rods 6. The detachable baffle 11 is fixed at a middle of the fixed baffle 9 by screws, which is hinged with the swinging baffle 13 below by the hinge 12 to ensure that the swinging baffle 13 can be flipped about a rotation shaft of the hinge 12.

Figure 6:
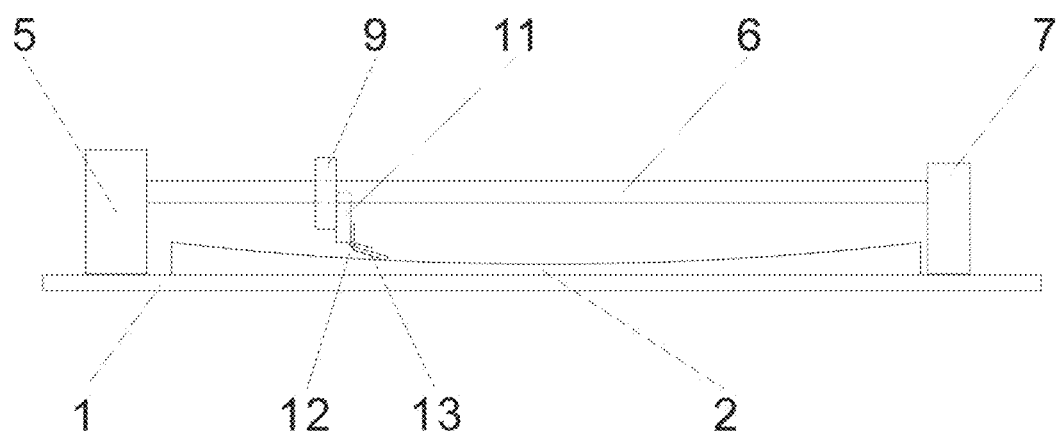
FIG. 6 is a cross-sectional view of a contact relationship between the baffle and a curved table.

Referring to FIGS. 4 and 6, a bottom of the swinging baffle 13 contacts with the top surface of the curved table 2. When the fixed baffle 9 moves, the swinging baffle 13 can swing up and down around the hinge 12. With gravity, the swinging baffle 13 is kept in contact with the top surface of the curved table 2 no matter where the fixed baffle 9 is.

According to the embodiment, the fixed baffle 9 will be moved to an ideal position before placing the experimental model and required experimental materials on the curved table 2. A crane is used to hoist the entire device into the large centrifuge basket, necessary lines should be connected to complete preparation. Then the large centrifuge is started. After the centrifuge accelerates to a preset acceleration value, the motor 3 is started according to experimental requirements for moving the fixed baffle 9 a preset distance at a preset speed, wherein the swinging baffle 13 moves the same distance at the same speed, in such a manner that the experimental model and materials on the top surface of the curved table 2 are deformed to generate experimental phenomena. After the experiment, the whole device is removed from the centrifuge basket.

The top surface of the curved table 2 is the arc-shaped cylindrical surface, so the model as a whole is in the shape of the arc-shaped cylindrical surface. Such structure can effectively avoid non-experimental flow of fluid experimental deformation materials. The arc-shaped cylindrical surface ensures that the experimental materials are on the same gravitational equipotential surface, making the analogue modelling of the geological structure more accurate. However, the top surface of the curved table 2 is the arc-shaped cylindrical surface which is fluctuated due to deformation, and an overall shape is still affected by the arc-shaped cylindrical surface. The collected experimental data such as image data, elevation data and velocity field data have systematic errors due to the non-horizontal shape of the curved model surface, which are corrected as follows.

Figure 2:
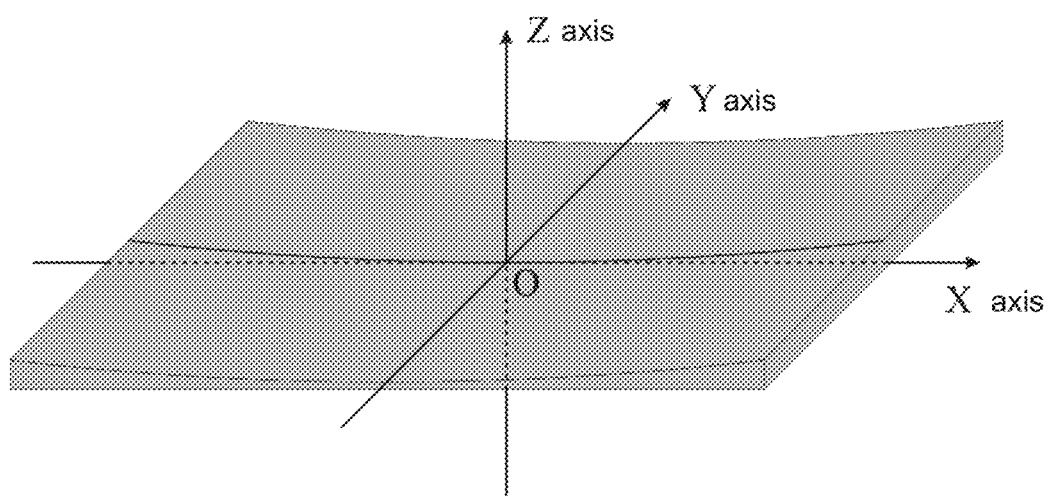
FIG. 2 illustrates a coordinate system established for elevation data processing.

Referring to FIG. 2, in order to process the elevation data, a center point of the top surface of the curved table should be taken as an origin. A straight line passing through the origin and parallel to a tangent to the arc surface is an X axis. A straight line passing through the origin and parallel to an axial direction of the arc surface is a Y axis. A straight line passing through the origin and perpendicular to a plane formed by the X axis and the Y axis is a Z axis. Then a three-dimensional coordinate system is established.

Figure 3:
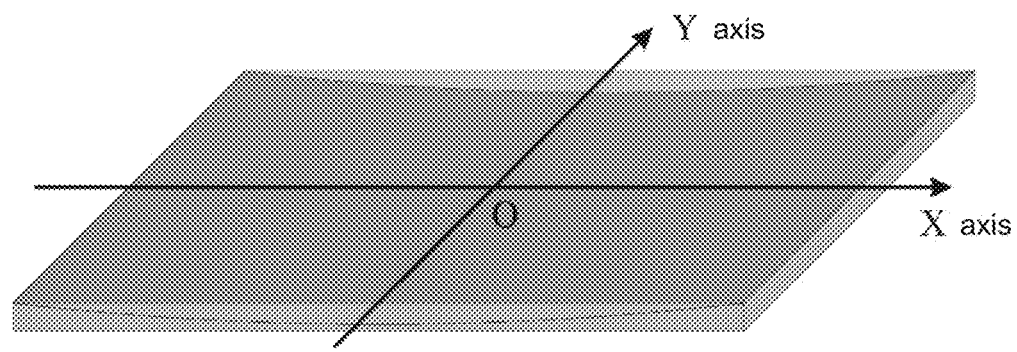
FIG. 3 illustrates a coordinate system established for image data and velocity field data processing.

Referring to FIG. 3, the initial elevation data can be obtained directly during the analogue modelling experiment of the hypergravity geological structure. The elevation data is a DEM file containing Digital Elevation Model, which comprises a two-dimensional plane coordinate and a three-dimensional elevation of each elevation point. The two-dimensional plane coordinate is represented by X and Y coordinates of the elevation point, and the three-dimensional elevation is represented by a Z coordinate of the elevation point.

I. Processing for the elevation data is divided into four steps. For convenience, R is a radius of curvature of the arc-shaped cylindrical surface on the curved table (a distance between the rotation shaft of the centrifuge and a center line of the top surface of the curved table). Taking point A as an example, the two-dimensional plane coordinate thereof is A(x, y) and the three-dimensional elevation is z. The specific steps will be explained one by one as follows.

1. According to the two-dimensional plane coordinate and the three-dimensional elevation of the point A, calculating a plane coordinate offset difference of the elevation point caused by the curved model surface.

It is assumed that h is a vertical distance from the point A to the top surface of the curved table at a bottom of the model, and θ is an angle between a radius of the centrifuge passing through the point A and a radius of the centrifuge passing through a center of the curved table. Since the two-dimensional plane coordinate offset difference only exists in a X-Y plane, the Z coordinate of the elevation point does not need to be corrected. At the same time, because the top surface of the curved table is straight along a Y-axis direction, there is no offset difference in the Y coordinate of the elevation point.

The plane coordinate offset difference of the elevation point is calculated as:

$$\Delta x = \frac{x(R-z)\left(z-R+\sqrt{R^2-x^2}\right)}{x^2+(R-z)^2}$$

$$\Delta y = 0$$

wherein R represents the radius of curvature of the arc-shaped cylindrical surface; Δx and Δy are X coordinate offset difference and Y coordinate offset difference of the elevation point, respectively.

2. According to the two-dimensional plane coordinate of the point A and the plane coordinate offset difference calculated in the step 1, calculating a two-dimensional plane coordinate of an orthographic point corresponding to the point A; wherein the orthographic point is a point on the top surface of the curved table that maintains an orthographic relationship with an original elevation point.

It is assumed that the two-dimensional plane coordinate of the orthographic point corresponding to point A is $A_o(x_o, y_o)$, which is calculated as:

$$x_o = x + \Delta x = \frac{x^3 + x(R-z)\sqrt{R^2-x^2}}{x^2+(R-z)^2}$$

$$y_o = y + \Delta y = y$$

the two-dimensional plane coordinate of the orthographic point is expressed as:

$$x_o = Q(x, z)$$

$$y_o = y$$

$$Q(x, z) = \frac{x^3 + x(R-z)\sqrt{R^2-x^2}}{x^2+(R-z)^2}$$

wherein Q(x, z) represents an X coordinate of the orthographic point corresponding to a feature point represented by x and z.

3. According to the two-dimensional plane coordinate of the orthographic point calculated in the step 2 and known surface arc equation as well as arc length formula of the top surface of the curved table, calculating a corrected two-dimensional plane coordinate and an elevation projection difference of the point A.

An arc length of the top surface of the curved table calculated according to the coordinate system as shown in FIG. 2 is:

$$l = \theta R$$

wherein l is an arc length of the orthographic point $A_o$ along the top surface of the curved table to the center line of the curved table.

The arc length l should be numerically equal to the corrected X coordinate of the elevation point, then:

$$\theta = \arcsin\frac{x_o}{R}$$

It is assumed that the corrected two-dimensional plane coordinate of the point A is $A_f(x_f, y_f)$, the top surface of the curved table is straight along the Y-axis direction, and there is no offset difference in the Y coordinate of the elevation point. The corrected two-dimensional plane coordinate of the point A is calculated as:

$$x_f = l = R\arcsin\frac{Q(x,z)}{R}$$

$$y_f = y_o = y$$

An arc equation of the top surface of the curved table is:

$$x^2+(z-R)^2=R^2$$

Eliminating an elevation projection difference means eliminating an elevation projection error due to the shape of arc-shaped cylindrical surface. The elevation projection difference at the point A and the X coordinate of the orthographic point $A_o$ at the point A satisfy the arc equation of the top surface of the curved table, i.e.:

$$x_o^2+(\delta z-R)^2=R^2$$

The elevation projection difference $\delta z$ is calculated as:

$$\delta z=z_o=R-\sqrt{R^2-x_o^2}$$

wherein $\delta z$ is the elevation projection difference of the point A.

4. According to the three-dimensional elevation of the point A and the elevation projection difference calculated in the step 3 calculating a corrected three-dimensional elevation of the point A.

The corrected three-dimensional elevation of the point A is $z_f$, which is calculated as:

$$z_f=z-\delta z=z-R+\sqrt{R^2-x_o^2}=z-R+\sqrt{R^2-[Q(x,z)]^2}$$

Therefore, according to the elevation point A of the elevation data, the two-dimensional plane coordinate is A(x, y) and the three-dimensional elevation is z. The corrected two-dimensional plane coordinate of the elevation point is $A_f(x_f, y_f)$ and the corrected three-dimensional elevation is $z_f$. The corrected data is expressed by the initial data as:

$$\begin{cases} x_f = R\arcsin\frac{Q(x,z)}{R} \\ y_f = y \\ z_f = z - R + \sqrt{R^2 - [Q(x,z)]^2} \end{cases}$$

$$Q(x,z) = \frac{x^3 + x(R-z)\sqrt{R^2-x^2}}{x^2+(R-z)^2}$$

wherein the corrected elevation data of the elevation point are finally obtained by combining the corrected two-dimensional plane coordinate and the corrected three-dimensional elevation of the elevation point.

II. Referring to FIG. 7, the velocity field data need to be obtained from the image data through PIV (Particle Image Velocimetry), which comprise a start point two-dimensional plane coordinate and a displacement of each feature point. The start point two-dimensional plane coordinate is expressed by the X and Y coordinates of a starting point of the feature point. The displacement is expressed by displacements of the feature point in the X direction and the Y direction within a time step. Processing for the velocity field data is divided into six steps. For convenience, R is the radius of curvature of the top surface on the curved table (the distance between the rotation shaft of the centrifuge and a center line of the top surface of the curved table). Taking point A as an example, the two-dimensional plane coordinate thereof is A(x, y), and displacements in the X direction and the Y direction are $d_x$ and $d_y$, respectively. The specific steps will be explained one by one as follows.

1. According to the start point two-dimensional plane coordinate and the displacement of the point A, calculating an end point two-dimensional plane coordinate of the point A.

It is assumed that an end point of the point A when the time step ends is A', and the end point two-dimensional plane coordinate is A'(x', y'), which is calculated as:

$$\begin{cases} x' = x + d_x \\ y' = y + d_y \end{cases}$$

2. According to the start point two-dimensional plane coordinate and the end point two-dimensional plane coordinate of the point A and three-dimensional elevations of the start point and the end point, respectively calculating a start point plane coordinate offset difference and an end point plane coordinate offset difference caused by the curved model surface.

It is assumed that the three-dimensional elevation of the elevation point in the elevation data corresponding to the start point of the point A is z, and the three-dimensional elevation of the elevation point in the elevation data corresponding to the end point of the point A is z'.

Since the orthographic correction process of the feature point in the velocity field data is the same as the orthographic correction process of the elevation point in the elevation data in principles, the expression formula of the plane coordinate offset difference in the elevation data processing is directly cited. Therefore, the start point plane coordinate offset difference of the point A is calculated as:

$$\Delta x = \frac{x(R-z)(z-R+\sqrt{R^2-x^2})}{x^2+(R-z)^2}$$

$$\Delta y = 0$$

The end point plane coordinate offset difference of the point A is calculated as:

$$\Delta x' = \frac{x'(R-z')(z'-R+\sqrt{R^2-x'^2})}{x'^2+(R-z')^2} = \frac{(x+d_x)(R-z')(z'-R+\sqrt{R^2-(x+d_x)^2})}{(x+d_x)^2+(R-z')^2}$$

$$\Delta y' = 0$$

3. According to the start point two-dimensional plane coordinate and the end point two-dimensional plane coordinate of the point A, and the start point plane coordinate offset difference and the end point plane coordinate offset difference calculated in the step 2, respectively calculating two-dimensional plane coordinates of orthographic points corresponding to the start point and the end point; wherein the orthographic point corresponding to the start point is a point on the top surface of the curved table that maintains an orthographic relationship with the start point of the feature point; the orthographic point corresponding to the end point is a point on the top surface of the curved table that maintains an orthographic relationship with the end point of the feature point.

It is assumed that the two-dimensional plane coordinate of the orthographic point corresponding to the start point of the point A is $A_o(x_o, y_o)$, which is calculated as:

$$x_o = x + \Delta x = \frac{x^3 + x(R-z)\sqrt{R^2-x^2}}{x^2 + (R-z)^2}$$

$$y_o = y + \Delta y = y$$

It is assumed that the two-dimensional plane coordinate of the orthographic point corresponding to the end point of the point A is $A'_o(x'_o, y'_o)$, which is calculated as:

$$x'_o = x' + \Delta x' = \frac{(x+d_x)^3 + (x+d_x)(R-z')\sqrt{R^2-(x+d_x)^2}}{(x+d_x)^2 + (R-z')^2}$$

$$y'_o = y' + \Delta y' = y + d_y$$

Therefore, the two-dimensional plane coordinate of the orthographic point corresponding to the start point of the point A is calculated as:

$$x_o = Q(x, z)$$

$$y_o = y$$

$$Q(x, z) = \frac{x^3 + x(R-z)\sqrt{R^2-x^2}}{x^2 + (R-z)^2}$$

the two-dimensional plane coordinate of the orthographic point corresponding to the end point of the point A is calculated as:

$$x'_o = Q(x+d_x, z')$$

$$y'_o = y + d_y$$

4. According to the two-dimensional plane coordinates of the orthographic points of the start point and the end point of the point A calculated in the step 3 and known surface arc equation as well as arc length formula of the top surface of the curved table, respectively calculating a corrected start point two-dimensional plane coordinate and a corrected end point two-dimensional plane coordinate.

Since the projection transformation process for the feature point in the velocity field data is the same as the projection transformation process for the elevation point in elevation data in principle, the expression formula of the corrected two-dimensional plane coordinate of the feature point in the elevation data is directly cited. It is assumed that the corrected start point two-dimensional plane coordinate of the point A is $A_f(x_f, y_f)$, which is calculated as:

$$x_f = R\arcsin\frac{Q(x, z)}{R}$$

$$y_f = y$$

The corrected end point two-dimensional plane coordinate of the point A is $A'_f(x'_f, y'_f)$ which is calculated as:

$$x'_f = R\arcsin\frac{Q(x+d_x, z')}{R}$$

$$y'_f = y + d_y$$

5. According to the corrected start point two-dimensional plane coordinate and the corrected end point two-dimensional plane coordinate of the point A, calculating a corrected displacement.

It is assumed that the corrected displacement of the point A in the X direction is $d_{xf}$, and the corrected displacement of the point A in the Y direction is $d_{yf}$. According to a position relationship between the displacement, the start point and the end point, it can be obtained that:

$$d_{xf} = x'_f - x_f = R\left[\arcsin\frac{Q(x+d_x, z')}{R} - \arcsin\frac{Q(x, z)}{R}\right]$$

$$d_{yf} = y'_f - y_f = d_y$$

Therefore, according to the feature point A of the velocity field data, the start point two-dimensional plane coordinate is $A(x, y)$ and an elevation of a point in the elevation data corresponding to the start point is z. An elevation of a point in the elevation data corresponding to the end point when the time step ends is z'. The displacement within the time step in the X direction is $d_x$, and the displacement within the time step in the Y direction is $d_y$. The corrected start point two-dimensional plane coordinate of the point A is $A_f(x_f, y_f)$, the corrected displacement of the point A in the X direction is $d_{xf}$, and the corrected displacement of the point A in the Y direction is $d_{yf}$. The corrected data is expressed by the initial data as:

$$\begin{cases} x_f = R\arcsin\frac{Q(x, z)}{R} \\ y_f = y \\ d_{xf} = R\left[\arcsin\frac{Q(x+d_x, z')}{R} - \arcsin\frac{Q(x, z)}{R}\right] \\ d_{yf} = d_y \end{cases}$$

$$Q(x, z) = \frac{x^3 + x(R-z)\sqrt{R^2-x^2}}{x^2 + (R-z)^2}$$

$$Q(x+d_x, z') = \frac{(x+d_x)^3 + (x+d_x)(r-z')\sqrt{R^2-(x+d_x)^2}}{(x+d_x)^2 + (r-z')^2}$$

wherein the corrected velocity field data of the feature point are finally obtained by combining the corrected start point two-dimensional plane coordinate and the corrected displacement of the feature point.

It can be seen that the present invention can effectively process the elevation data and the velocity field data in the analogue modelling experiment of the hypergravity geological structure, while eliminating the plane offset difference caused by the surface fluctuation of the model, the present invention further eliminates the projection difference of the model due to a non-horizontal shape. As a result, the processed data can be directly used in analogy analysis with the analogue modelling experimental data of a normal gravity geological structure, so as to more realistically and objectively reflect the experimental phenomenon, which is conducive to truly expressing the experimental results and facilitates the analogy analysis with the actual geological prototype. Therefore, the present invention has many technical advantages and significant technical effects.

What is claimed is:

1. A data processing method for an analogue modelling experiment of a hypergravity geological structure, comprising steps of:
   1) performing two-dimensional photographing and three-dimensional elevation scanning with an analogue modelling experiment device with a curved model surface for the hypergravity geological structure, so as to collect initial elevation data and initial velocity field data; and
   2) correcting the initial elevation data and the initial velocity field data to obtain corrected elevation data and corrected velocity field data;
   wherein the step 1) specifically adopts the analogue modelling experiment device of the hypergravity geological structure, wherein a deformation material (15) is placed on a curved table (2) of a centrifuge basket; a top surface of the curved table (2) is an arc-shaped cylindrical surface; a model frame (14) is placed on the curved table (2), and the deformation material (15) is place in an enclosed area of the model frame (14); an industrial camera or a three-dimensional scanner (16) is provided right above the curved table (2); during rotation of a centrifuge, the arc-shaped cylindrical surface of the curved table (2) on the centrifuge basket rotates around a rotation axis of the centrifuge; when the centrifuge rotates, trajectories of all parts of the arc-shaped cylindrical surface of the curved table (2) are on a same cylindrical surface with the rotation axis of the centrifuge as a central axis; the initial elevation data and the initial velocity field data are obtained by performing two-dimensional photographing and three-dimensional elevation scanning on a top surface of the deformation material (15) by the industrial camera or the three-dimensional scanner (16);
   wherein the analogue modelling experiment device comprises: a bottom plate (1) and the curved table (2); wherein the bottom plate (1) is placed on the centrifuge basket, and screw assemblies are provided on both sides of the bottom plate (1); each of the screw assemblies comprises: a screw rod (6), a slide rail (8), a diverter (5) and a screw rod supporter (7), wherein the screw rod (6) is parallel to the bottom plate (1); two ends of the screw rod (6) are supported and connected between the diverter (5) and the screw rod supporter (7); the diverter (5) and the screw rod supporter (7) are fixed on the bottom plate (1), and the slide rail (8) is fixed on the bottom plate (1) under the screw rod (6); a motor (3) is fixed on the bottom plate (1) and between same ends of the two screws (6); two output shafts are symmetrically arranged at both ends of the motor (3), which are connected to one ends of the two diverters (5) of the screw assemblies through corresponding transmission shafts (4), respectively; the other ends of the diverters (5) are connected to ends of the screw rods (6), respectively; a fixed baffle (9) is connected between the two screw rods (6) of the two screw assemblies; two end portions of the fixed baffle (9) are screwed with the screw rods (6), and a bottom of each end of the fixed baffle (9) is engaged with the slide rail (8); a slider (10) is connected to the bottom of each end of the fixed baffle (9) and is engaged with the slide rail (8); a detachable baffle (11) is mounted on a bottom portion of the fixed baffle (9), and a bottom end of the detachable baffle (11) is hinged with a swinging baffle (13) through a hinge (12); the curved table (2) is fixed at a center of the bottom plate (1), and the top surface of the curved table (2) is the arc-shaped cylindrical surface; a tangent direction of the arc-shaped cylindrical surface is parallel to the screw rod (6), and a generatrix direction of the of the arc-shaped cylindrical surface is parallel to the fixed baffle (9); when the centrifuge rotates, the trajectories of all the parts of the arc-shaped cylindrical surface of the curved table (2) are on the same cylindrical surface with the rotation axis of the centrifuge as the central axis; the swinging baffle (13) is made of a flexible material, which covers and contacts with the arc-shaped cylindrical surface of the curved table (2).

2. The data processing method, as recited in claim 1, wherein a radius of curvature of the arc-shaped cylindrical surface is equal to a distance between the rotation axis of the centrifuge during rotation and a bottom surface of the bottom plate (1), minus a thickness of the bottom plate (1), and then minus a center thickness of the curved table (2).

3. The data processing method, as recited in claim 1, wherein in the step 2), a three-dimensional coordinate system is established for the initial elevation data collected in the analogue modelling experiment of the hypergravity geological structure; each elevation point in the initial elevation data has an initial two-dimensional plane coordinate and an initial three-dimensional elevation; wherein a correction method for each elevation point comprises steps of:
   I, according to the initial two-dimensional plane coordinate and the initial three-dimensional elevation of the elevation point, calculating a plane coordinate offset difference of the elevation point caused by the curved model surface;
   II, according to the initial two-dimensional plane coordinate of the elevation point and the plane coordinate offset difference calculated in the step I, calculating a two-dimensional plane coordinate of an orthographic point corresponding to the elevation point;
   III, according to the two-dimensional plane coordinate of the orthographic point calculated in the step II and known surface arc equation as well as arc length formula of the top surface of the curved table, calculating a corrected two-dimensional plane coordinate of the elevation point and an elevation projection difference; and
   IV, according to the initial three-dimensional elevation of the elevation point and the elevation projection difference calculated in the step III, calculating a corrected three-dimensional elevation of the elevation point;
   wherein the corrected elevation data of the elevation point are finally obtained by combining the corrected two-dimensional plane coordinate and the corrected three-dimensional elevation of the elevation point.

4. The data processing method, as recited in claim 3, wherein the corrected two-dimensional plane coordinate and the corrected three-dimensional elevation are calculated as:

$$\begin{cases} x_f = R \arcsin \dfrac{Q(x, z)}{R} \\ y_f = y \\ z_f = z - R + \sqrt{R^2 - [Q(x, z)]^2} \end{cases}$$

-continued $$Q(x, z) = \frac{x^3 + x(R-z)\sqrt{R^2 - x^2}}{x^2 + (R-z)^2}$$

wherein x and y represent the initial two-dimensional plane coordinate of the elevation point; z represents the initial three-dimensional elevation of the elevation point; $x_f$ and $y_f$ represent the corrected two-dimensional plane coordinate of the elevation point; $z_f$ represents the corrected three-dimensional elevation of the elevation point; Q(x, z) represents an X coordinate of the orthographic point corresponding to the elevation point represented by x and z; and R represents the radius of curvature of the arc-shaped cylindrical surface of the curved table.

5. The data processing method, as recited in claim 1, wherein in the step 2), a two-dimensional coordinate system is established for the initial velocity field data collected in the analogue modelling experiment of the hypergravity geological structure; each feature point in the initial velocity field data has a start point two-dimensional plane coordinate where a time step begins and a displacement from a start point to an end point within the time step; wherein a correction method for each feature point comprises steps of:

I, according to the start point two-dimensional plane coordinate and the displacement of the feature point, calculating an end point two-dimensional plane coordinate of the feature point;

II, according to the start point two-dimensional plane coordinate and the end point two-dimensional plane coordinate of the feature point and three-dimensional elevations of the start point and the end point, respectively calculating a start point plane coordinate offset difference and an end point plane coordinate offset difference caused by the curved model surface;

III, according to the start point two-dimensional plane coordinate and the end point two-dimensional plane coordinate, and the start point plane coordinate offset difference and the end point plane coordinate offset difference calculated in the step II, respectively calculating two-dimensional plane coordinates of orthographic points corresponding to the start point and the end point;

IV, according to the two-dimensional plane coordinates of the orthographic points of the start point and the end point calculated in the step III and known surface arc equation as well as arc length formula of the top surface of the curved table, respectively calculating a corrected start point two-dimensional plane coordinate and a corrected end point two-dimensional plane coordinate; and V, according to the corrected start point two-dimensional plane coordinate and the corrected end point two-dimensional plane coordinate, calculating a corrected displacement of the feature point;

wherein the corrected velocity field data of the feature point are finally obtained by combining the corrected start point two-dimensional plane coordinate and the corrected displacement of the feature point.

6. The data processing method, as recited in claim 5, wherein in the step 2), the three-dimensional elevations of the start point and the end point are initial three-dimensional elevations of the start point and the end point in the initial elevation data.

7. The data processing method, as recited in claim 5, wherein a corrected two-dimensional coordinate of the feature point and the corrected displacement of the feature point along two directions of the two-dimensional coordinate system are calculated as:

$$\begin{cases} x_f = R\arcsin\dfrac{Q(x, z)}{R} \\ y_f = y \\ d_{xf} = R\left[\arcsin\dfrac{Q(x+d_x, z')}{R} - \arcsin\dfrac{Q(x, z)}{R}\right] \\ d_{yf} = d_y \end{cases}$$

$$Q(x, z) = \frac{x^3 + x(R-z)\sqrt{R^2 - x^2}}{x^2 + (R-z)^2}$$

$$Q(x+d_x, z') = \frac{(x+d_x)^3 + (x+d_x)(r-z')\sqrt{R^2 - (x+d_x)^2}}{(x+d_x)^2 + (r-z')^2}$$

wherein x and y represent an initial two-dimensional plane coordinate of the feature point; z represents an initial three-dimensional elevation of the feature point; $x_f$ and $y_f$ represent the corrected two-dimensional plane coordinate of the feature point; $d_{xf}$ and $d_{yf}$ represent the corrected displacement of the feature point along the two directions of the two-dimensional coordinate system; Q(x, z) represents an X coordinate of an orthographic point corresponding to the feature point represented by x and z; $Q(x+_x,z')$ represents an X coordinate of an orthographic point corresponding to the feature point represented by $x+d_x$ and z'; and R represents the radius of curvature of the arc-shaped cylindrical surface of the curved table.

* * * * *